United States Patent
Allidieres et al.

(10) Patent No.: US 8,047,395 B2
(45) Date of Patent: Nov. 1, 2011

(54) CRYOGENIC FLUID TANK AND USE IN A MOTOR VEHICLE

(75) Inventors: Laurent Allidieres, Uriage (FR); Florent Janin, Moirans (FR); Eric Faure, Coublevie (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1276 days.

(21) Appl. No.: 10/561,291

(22) PCT Filed: Jun. 22, 2004

(86) PCT No.: PCT/FR2004/050286
§ 371 (c)(1),
(2), (4) Date: Dec. 20, 2005

(87) PCT Pub. No.: WO2005/005878
PCT Pub. Date: Jan. 20, 2005

(65) Prior Publication Data
US 2007/0102433 A1    May 10, 2007

(30) Foreign Application Priority Data
Jul. 2, 2003   (FR) ..................................... 03 08030

(51) Int. Cl.
*F17C 13/00* (2006.01)
(52) U.S. Cl. ............ 220/560.11; 220/560.04; 220/560.1
(58) Field of Classification Search ............. 220/560.04, 220/560.11, 560.12, 560.1
See application file for complete search history.

(56) References Cited

U.S. PATENT DOCUMENTS

| | | | | |
|---|---|---|---|---|
| 1,979,221 A | * | 10/1934 | Dana | 62/45.1 |
| 3,155,265 A | * | 11/1964 | Reese | 220/560.05 |
| 3,191,795 A | * | 6/1965 | Molnar | 220/560.1 |
| 3,208,622 A | * | 9/1965 | Trentham et al. | 220/560.09 |
| 3,347,402 A | * | 10/1967 | Forman et al. | 220/560.1 |
| 3,438,115 A | * | 4/1969 | Zeunik et al. | 29/419.2 |
| 3,460,706 A | * | 8/1969 | Hoover | 220/592.2 |
| 3,941,272 A | * | 3/1976 | McLaughlin | 220/560.11 |
| 4,964,524 A | | 10/1990 | Halene | |
| 5,063,651 A | * | 11/1991 | Kneip et al. | 29/455.1 |
| 5,263,604 A | | 11/1993 | Metz | |
| 5,398,839 A | * | 3/1995 | Kleyn | 220/560.03 |

(Continued)

FOREIGN PATENT DOCUMENTS
DE   198 16 651   11/1999
(Continued)

OTHER PUBLICATIONS
International Search Report for PCT/FR2004/050286.

Primary Examiner — Anthony Stashick
Assistant Examiner — Christopher B McKinley
(74) Attorney, Agent, or Firm — Christopher J. Cronin

(57) ABSTRACT

The main opposite surfaces (4a, 4b; 5a, 5b) of the inner (1) and outer (2) coverings are directly linked to each other by rigid coaxial linking elements (9;10), flexible linking elements (15) joining a main surface (5a) of the outer covering to an opposite surface (4b) of the inner covering (1) and vice-versa. The invention can be used for the storage of cryogenic fuel used as a power source for motor vehicles.

7 Claims, 3 Drawing Sheets

U.S. PATENT DOCUMENTS

| | | | |
|---|---|---|---|
| 6,595,382 B2 * | 7/2003 | Ettlinger | 220/560.11 |
| 6,708,502 B1 * | 3/2004 | Aceves et al. | 62/45.1 |
| 6,880,719 B1 * | 4/2005 | Sutton et al. | 220/560.1 |
| 7,165,698 B2 * | 1/2007 | Immel et al. | 220/560.05 |
| 2001/0019061 A1 | 9/2001 | Ettlinger | |
| 2004/0195246 A1 * | 10/2004 | Immel et al. | 220/560.12 |

FOREIGN PATENT DOCUMENTS

FR  2 813 378  3/2002

\* cited by examiner

CRYOGENIC FLUID TANK AND USE IN A MOTOR VEHICLE

The present invention relates to cryogenic fluid tanks, in particular liquid cryogen tanks, of the type comprising an inner casing arranged in an outer casing with a vacuum insulation space positioned in between, the casings having a flattened, for example parallelepipedal, general configuration.

For reasons of installability, vehicle-borne tanks, particularly those in motor vehicles, are required to have flattened shapes which do not have the same advantageous mechanical stability properties as the spherical or cylindrical shapes conventionally used for the storage of pressurized fluids. Moreover, vehicle-borne tanks must be capable of withstanding high transverse accelerations, a factor which creates problems with regard not only to the mechanical stability of the casings but also to their assembly with one another, the latter problem being further complicated by the questions of heat exchange between the two casings.

The specific object of the present invention is to provide a liquid cryogenic fluid tank structure having a double casing and combining high mechanical strength with very light weight.

To make this possible, according to one feature of the invention the tank comprises at least one hollow tubular structure which connects the two main faces of the inner casing and in which there extends at least one rigid linking element connecting the two main faces of the outer casing, and at least two flexible linking elements respectively connecting a main face of the outer casing to a main face of the inner casing.

According to other features of the invention:
each flexible linking element connects a main face of one casing to the opposed main face of the other casing,
the flexible linking elements are mounted under tension in tension between end swivel fittings,
the tank comprises a plurality of flexible linking elements angularly distributed around the rigid linking element.

The present invention also relates to the use of such a tank for the storage of a liquid cryogen used as a power source in a motor vehicle.

Other features and advantages of the present invention will emerge from the following description of an embodiment, given by way of illustration but with no limitation being implied, with reference to the appended drawings, in which.

Figure 1:
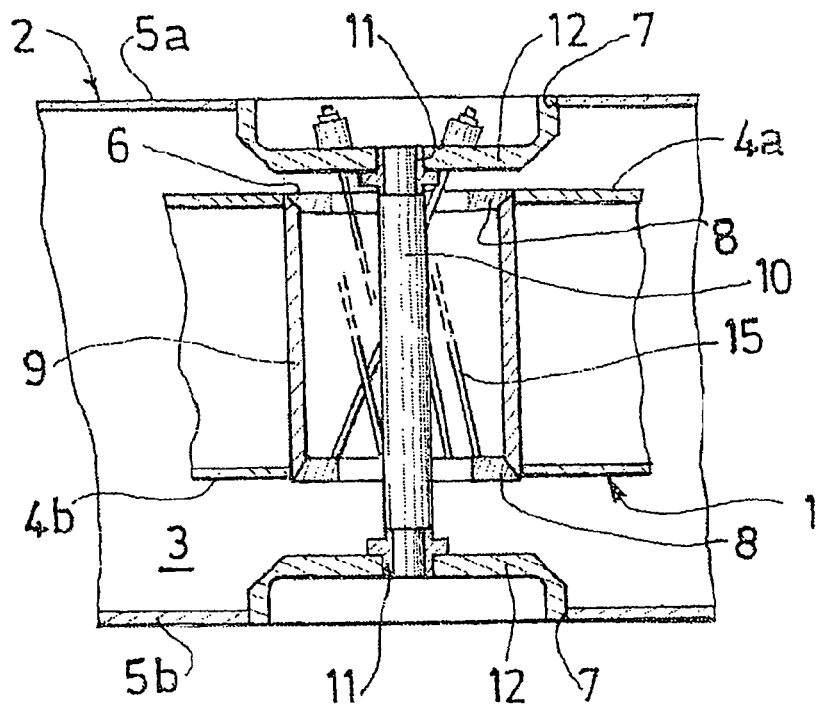
FIG. 1 is a schematic view in partial vertical section of a tank according to the invention having a parallelepipedal general configuration.

FIG. 1 is a schematic representation (the thicknesses of the walls are not to scale) of a portion of an inner storage casing, generally designated by the reference 1, arranged in an outer casing, generally designated by the reference 2, a vacuum insulation space 3 being formed between the two casings 1 and 2.

Figure 2:
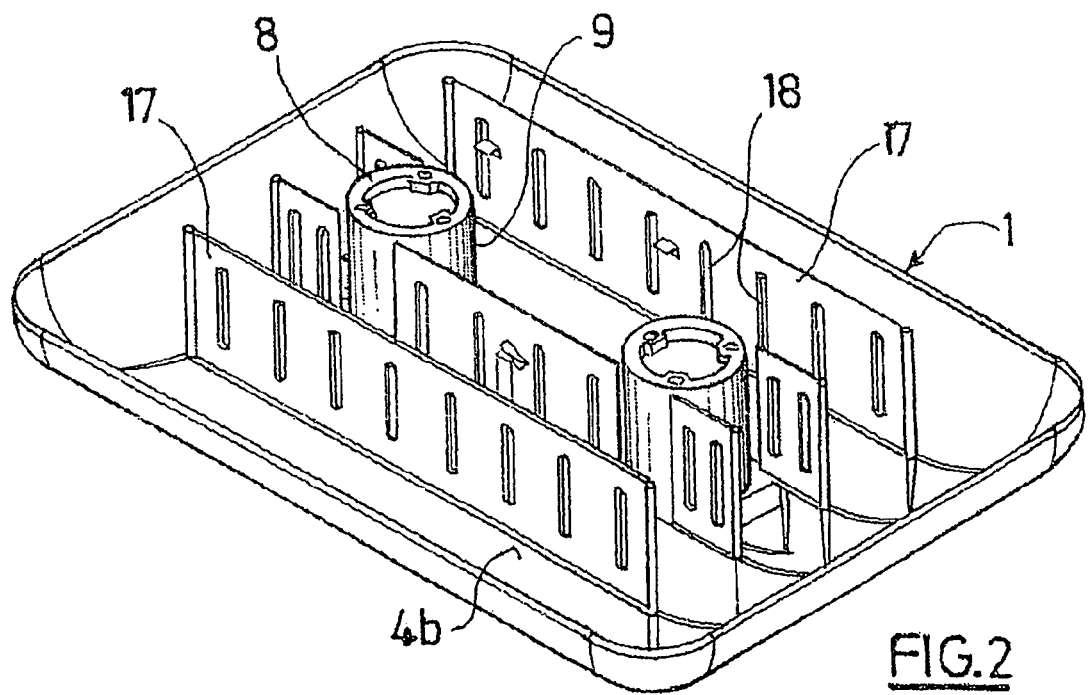
FIG. 2 is a perspective view of one half of an inner casing.
Figure 3:
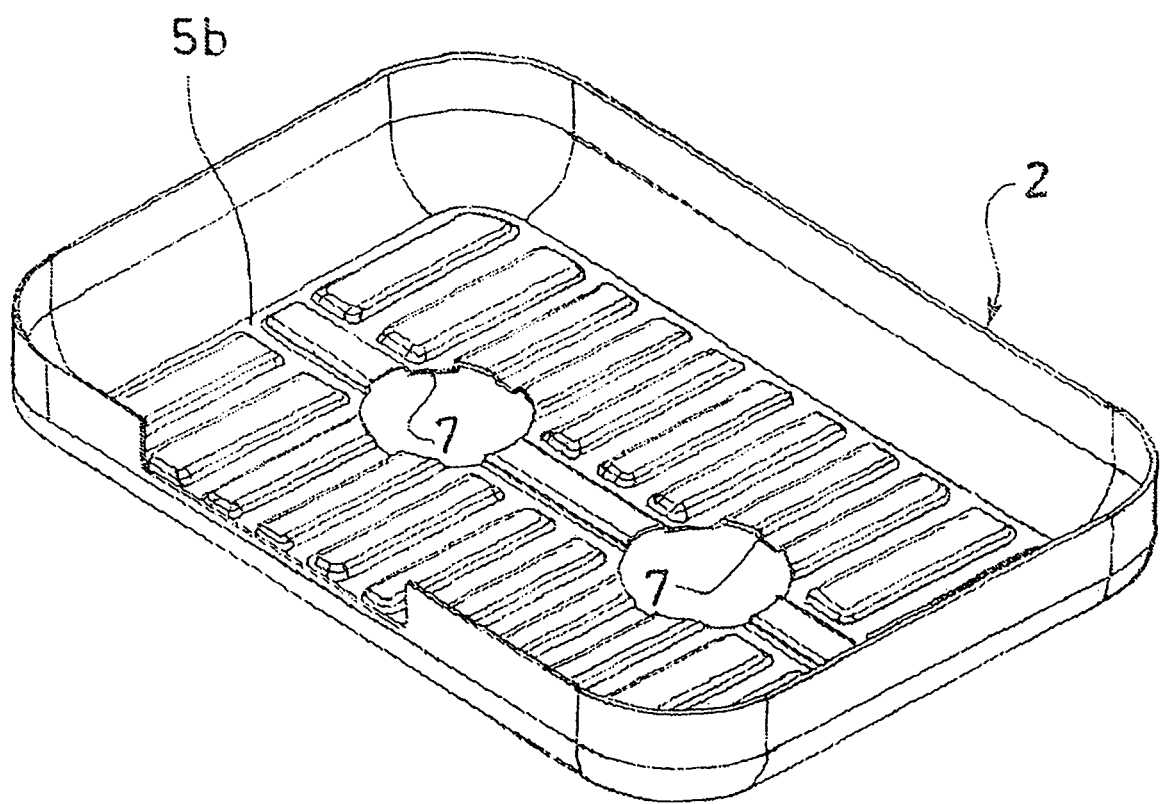
FIG. 3 is a perspective view of one half of an outer casing.

In the embodiment represented, the casings 1 and 2 have a parallelepipedal general configuration, as can clearly be seen from FIGS. 2 and 3, with each of the main faces, 4a and 4b in the case of the inner casing 1 and 5a, 5b in the case of the outer casing 2, being situated opposite one another.

The main faces have at least one pair of mutually opposite coaxial orifices, typically two pairs in the examples represented, denoted by 6 in the case of the walls of the inner casing 1 and by 7 in the case of the walls of the outer casing.

The orifices 6 of the inner casing 1 have mounted within them, typically by plasma welding, annular end rings 8 of an inner tubular structure 9 providing a rigid connection between the main faces 4a and 4b of the inner casing 1 and through which there extends a central tube 10 which continues on both sides into the intermediate vacuum space 3 and which is fastened, by welding, at its ends to shoulders 11 in the mutually opposite planar faces of cylindrical cups 12 mounted, typically by plasma welding, in the mutually opposite orifices 7 of the main faces 5a and 5b of the outer casing 2.

Figure 4:
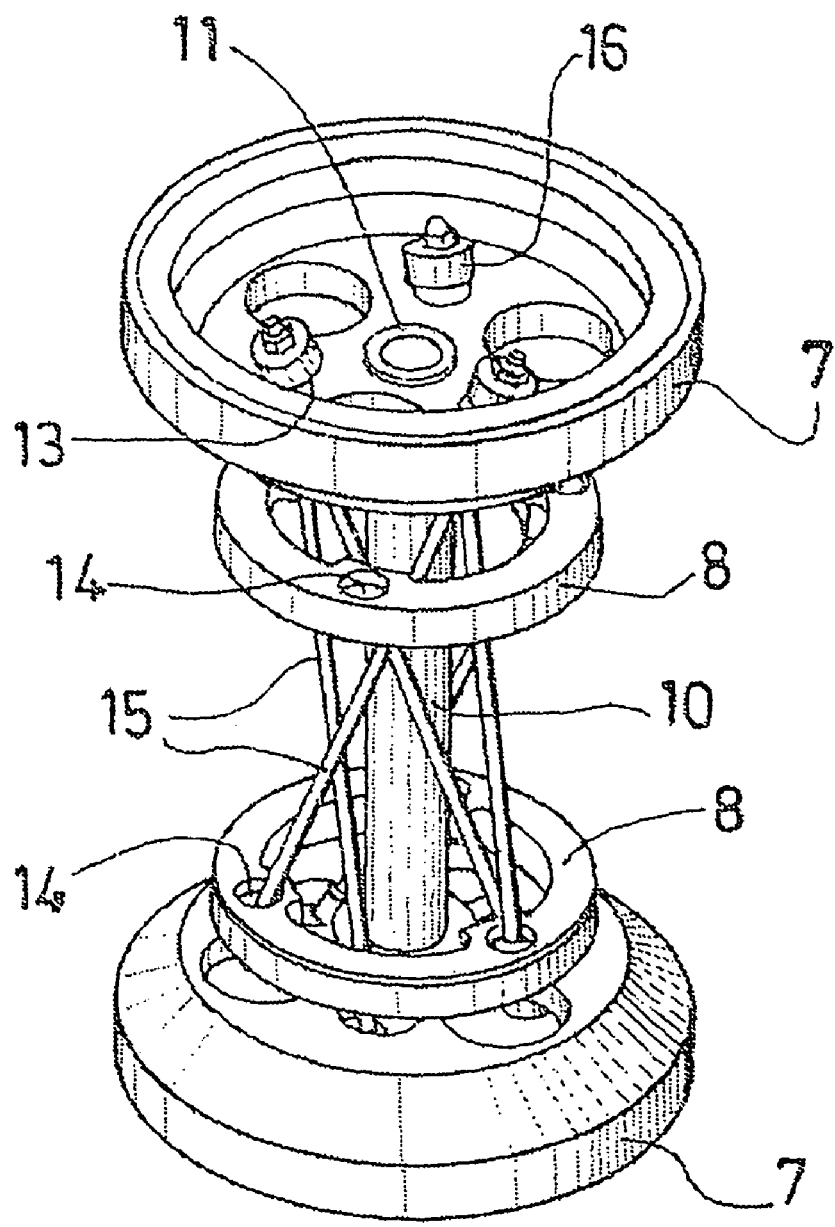
FIG. 4 is a perspective view of a system shown in FIG. 1 for supporting the inner casing in the outer casing.

As can be seen more clearly from FIG. 4, the bases of the cups 7 and the rings 8 have respective orifices 13, 14 which allow the passage of ties 15 and serve externally for housing swivel fittings 16 for fastening and clamping these ties 15 under tension.

According to the invention, and as can clearly be seen from FIGS. 1 and 4, the rigid linking tubes 9 and 10 ensure that each casing is able to take up stresses applied to the main faces of the inner and outer enclosures, and the ties 15 each have one end connected to a main face (for example 5a) of the outer casing (via the cup 12) and the other end connected to the opposed main face (in this example: 4b) of the outer casing 1 (via the ring 8). The inner casing is thus completely suspended in the outer casing, any vertical displacement between the casings being prohibited, any lateral displacement between the casings likewise being prohibited by doubling the supporting system as in the example represented.

As represented in FIGS. 2 and 3, the casings 1 and 2 are ribbed so as to increase their rigidity, and the inner casing 1 has internally a series of vertical parallel partitions 17 reinforced by bosses 18 and making it possible for emptying operations to be performed on the tank without causing the latter to subside, the partitions extending longitudinally over most of the length of the casing 1 and forming spaces for the tubular structures 9.

As will be understood, with the arrangement which has just been described, the tendencies of the casings 1 and 2 to collapse are counteracted in compression by the rigid spacers 9 and 10, respectively, while the tendencies of the inner casing 1 to swell by virtue of the pressure differentials across its walls are counteracted in tension which is equally distributed by the ties 15 while preserving the "floating" nature of the casing 1.

For storage applications of liquid cryogenic fuel, such as liquefied natural gas or hydrogen, in motor vehicles, the casings 1 and 2 are advantageously made of stainless steel having a thickness below 4 mm, typically below 3 mm, in the form of two forged half-shells assembled via their meridian plane parallel to the main faces 4 and 5. The linking tubes 9 and 10, the rings 8 and the cups 7 are likewise advantageously composed of stainless steel and the ties 15 are advantageously composed of strands of nonmetallic, typically glass, fibers in an epoxy, having a diameter not exceeding 5 mm. In this embodiment, three ties 15 tensioned between the faces 5a and 4b and three ties tensioned between the faces 5b and 4a are provided in an alternating angular arrangement around the tube 10.

Although the invention has been described in relation to a specific embodiment, it is not limited thereto but is open to modifications and variants which will become apparent to a person skilled in the art within the scope of the claims which follow. In particular, the tank may, according to the requirements of installation in situ, have other flattened shapes, for example the shape of a disk which is at least partially axisymmetrical, optionally oblong, or segmented in the form of petals.

The invention claimed is:

1. A cryogenic fluid tank comprising an inner casing arranged in an outer casing with a vacuum insulation space in between, the casings having a flattened general configuration, wherein it comprises at least one tubular structure which connects two main faces of the inner casing and in which there extends at least one rigid linking element connecting the two main faces of the outer casing, and at least two flexible linking elements respectively connecting a main face of the outer casing and a main face of the inner casing, wherein the flexible linking elements are mounted in tension between end swivel fittings.

2. The tank of claim 1, wherein the tubular structure is integral with two end rings fastened to the main faces of the inner casing.

3. A cryogenic fluid tank comprising an inner casing arranged in an outer casing with a vacuum insulation space in between, the casings having a flattened general configuration, wherein it comprises at least one tubular structure which connects two main faces of the inner casing and in which there extends at least one rigid linking element connecting the two main faces of the outer casing, and at least two flexible linking elements respectively connecting a main face of the outer casing and a main face of the inner casing, wherein the rigid linking element is mounted between two cylindrical cups fastened to the main faces of the outer casing.

4. The tank of claim 1, wherein it has a plurality of flexible linking elements angularly distributed around the rigid linking element.

5. The tank of claim 1, wherein the flexible linking elements consist of strands of nonmetallic fibers.

6. The tank of claim 1, wherein the casings are metallic.

7. The use of the tank of claim 1 for the storage of cryogenic fluid in a motor vehicle.

* * * * *